US012763846B2

(12) United States Patent
Chen

(10) Patent No.: US 12,763,846 B2
(45) Date of Patent: Oct. 13, 2026

(54) METHOD AND DEVICE FOR DETERMINING SATELLITE LINK INFORMATION

(71) Applicant: Beijing Xiaomi Mobile Software Co., Ltd., Beijing (CN)

(72) Inventor: Dong Chen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 500 days.

(21) Appl. No.: 18/264,797

(22) PCT Filed: Feb. 9, 2021

(86) PCT No.: PCT/CN2021/076141

§ 371 (c)(1),
(2) Date: Aug. 9, 2023

(87) PCT Pub. No.: WO2022/170446

PCT Pub. Date: Aug. 18, 2022

(65) Prior Publication Data

US 2024/0313851 A1 Sep. 19, 2024

(51) Int. Cl.
*H04B 7/185* (2006.01)

(52) U.S. Cl.
CPC ................................ *H04B 7/18513* (2013.01)

(58) Field of Classification Search
CPC .. H04B 7/18513; H04B 7/1851; H04W 84/06
See application file for complete search history.

(56) References Cited

U.S. PATENT DOCUMENTS

| | | | | |
|---|---|---|---|---|
| 12,192,753 | B2 * | 1/2025 | Zaus | H04L 65/1016 |
| 2020/0178090 | A1 | 6/2020 | Murphy | |
| 2021/0092640 | A1 * | 3/2021 | Ravishankar | H04L 47/6275 |

FOREIGN PATENT DOCUMENTS

| | | | |
|---|---|---|---|
| CN | 108768498 A | | 11/2018 |
| CN | 110536482 A | | 12/2019 |
| CN | 111641450 A | | 9/2020 |
| WO | WO 2022/099709 A1 | | 5/2022 |

OTHER PUBLICATIONS

International Search Report issued Nov. 9, 2021 in PCT/CN2021/076141, filed on Feb. 9, 2021, 4 pages (with English Translation).

Chinese Office Action issued May 25, 2023 in CN 202180000378.X, 6 pages.

"A combined solution for key issue 5", (S2-1909477), CATT, SA WG2 Meeting #135, 2019, 8 pages.

(Continued)

*Primary Examiner* — Fred A Casca
(74) *Attorney, Agent, or Firm* — Oblon, McClelland, Maier & Neustadt, L.L.P.

(57) ABSTRACT

The present disclosure provides a method for determining satellite link information, in which the satellite link information corresponding to a terminal is determined based on information of a cell in which the terminal is located and network deployment information corresponding to the UPF network element.

7 Claims, 7 Drawing Sheets

(56) References Cited

OTHER PUBLICATIONS

"Proposed updates to solution #11 to align with AF session set up to request QoS", (S2-1912040), Ericsson, SA WG2 Meeting #S2-136, 2019, 10 pages.
3GPP TS 23.501 V18.2.2 (Jul. 2023), "3rd Generation Partnership Project; Technical Specification Group Services and System Aspects; System architecture for the 5G System (5GS); Stage 2 (Release 18)", 684 pages.
3GPP TS 23.502 V18.2.0 (Jun. 2023), "3rd Generation Partnership Project; Technical Specification Group Services and System Aspects; Procedures for the 5G System (5GS); Stage 2 (Release 18)", 885 pages.
3GPP TS 23.503 V18.2.0 (Jun. 2023), "3rd Generation Partnership Project; Technical Specification Group Services and System Aspects; Policy and charging control framework for the 5G System (5GS)"; Stage 2 (Release 18), 173 pages.
3GPP TR 23.737 V17.2.0 (Mar. 2021), "3rd Generation Partnership Project; Technical Specification Group Services and System Aspects; Study on architecture aspects for using satellite access in 5G (Release 17)", 95 pages.
"Backhaul satellite category per network instance", (S2-2008453), 3GPP TSG SA WG2 Meeting #142E, 2020, 2 pages.

* cited by examiner

METHOD AND DEVICE FOR DETERMINING SATELLITE LINK INFORMATION

CROSS-REFERENCE TO RELATED APPLICATIONS

The present application is a U.S. National Stage of International Application No. PCT/CN2021/076141 filed on Feb. 9, 2021, the entire contents of which are incorporated herein by reference for all purposes.

BACKGROUND

Technical Field

The present disclosure relates to the field of mobile communication technology, and in particular, to a method and device for determining satellite link information.

Description

In the current communication network system, communication between a core network and a mobile terminal can be achieved through a satellite link. However, since the satellite link usually has high latency, if the latency requirements of certain services of the terminal are not met, the services cannot be responded to properly.

SUMMARY

The present disclosure provides a method and device for determining satellite link information.

A first aspect of the present disclosure provides a method for determining satellite link information, which is applied to a user plane function (UPF) network element, including: determining the satellite link information corresponding to a terminal based on information of a cell in which the terminal is located and network deployment information corresponding to the UPF network element. The information of the cell includes at least one of an identity of the cell or an identity of an access network node to which the cell belongs, the network deployment information includes first deployment information indicating whether a satellite link is available for connection of the UPF network element with the access network node and second deployment information indicating whether the satellite link is available for connection of the access network node with the terminal, and the satellite link information includes at least one of satellite backhaul information related to the connection of the UPF network element with the access network node or satellite access information related to the connection of the access network node with the terminal.

In some embodiments, determining the satellite link information corresponding to the terminal based on the information of the cell in which the terminal is located and the network deployment information corresponding to the UPF network element includes: when the first deployment information indicates that the satellite link is available for the connection of the UPF network element with the access network node, determining the satellite backhaul information corresponding to the terminal based on the information of the cell in which the terminal is located, the satellite backhaul information including any one or more of that whether the terminal is currently using satellite backhaul or not, that whether the satellite backhaul currently used by the terminal is changed or not, or that whether the terminal is currently within an area of interest or not, and when the second deployment information indicates that the satellite link is available for the connection of the access network node with the terminal, determining the satellite access information corresponding to the terminal based on the information of the cell in which the terminal is located, the satellite access information including any one or more of that whether the terminal is currently using satellite access or not, that whether the satellite access currently used by the terminal is changed, or that whether the terminal is currently within the area of interest.

In some embodiments, the method further includes: sending the satellite link information corresponding to the terminal to a session management function (SMF) network element.

In some embodiments, sending the satellite link information corresponding to the terminal to the session management function (SMF) network element includes: sending, in response to a packet data unit session establishment request or a packet data unit session modification request from the SMF network element, the satellite link information corresponding to the terminal to the SMF network element.

In some embodiments, the method further includes sending a terminal information subscription request to the access network node corresponding to the UPF network element, the terminal information subscription request instructing the access network node to send, to the UPF network element, the information of the cell in which the terminal establishing the connection with the access network node is located, and/or receiving, from the access network node corresponding to the UPF network element, the information of the cell in which the terminal establishing the connection with the access network node is located.

A second aspect of the present disclosure provides a method for determining satellite link information, which is applied to a session management function (SMF) network element, including obtaining the satellite link information corresponding to a terminal from a user plane function (UPF) network element, wherein the satellite link information includes at least one of satellite access information related to connection of the terminal with an access network node or satellite backhaul information related to connection of the UPF network element with the access network node.

In some embodiments, the satellite backhaul information includes any one or more of that whether the terminal is currently using satellite backhaul or not, that whether the satellite backhaul currently used by the terminal is changed or not, or that whether the terminal is currently within an area of interest or not, and the satellite access information includes any one or more of that whether the terminal is currently using satellite access or not, that whether the satellite access currently used by the terminal is changed, or that whether the terminal is currently within the area of interest.

In some embodiments, the method further includes: sending the satellite link information to a policy control function (PCF) network element.

In some embodiments, the method further includes obtaining a satellite link information subscription request from the PCF network element, the satellite link information subscription request instructing the SMF network element to send, in response to receiving the satellite link information, the satellite link information to the PCF network element.

In some embodiments, obtaining the satellite link information corresponding to the terminal from the user plane function (UPF) network element includes obtaining the satellite link information from the UPF network element by sending a packet data unit session establishment request or a packet data unit session modification request to the UPF network element.

A third aspect of the present disclosure provides a method of determining satellite link information, which is applied to a policy control function (PCF) network element, including: obtaining the satellite link information corresponding to a terminal from a session management function (SMF) network element, wherein the satellite link information includes at least one of satellite access information related to connection of the terminal with an access network node or satellite backhaul information related to connection of the access network node with a corresponding UPF network element.

In some embodiments, the satellite backhaul information includes any one or more of that whether the terminal is currently using satellite backhaul or not, that whether the satellite backhaul currently used by the terminal is changed or not, or that whether the terminal is currently within an area of interest or not, and the satellite access information includes any one or more of that whether the terminal is currently using satellite access or not, that whether the satellite access currently used by the terminal is changed, or that whether the terminal is currently within the area of interest.

In some embodiments, the method further includes sending a satellite link information subscription request to the SMF network element, the satellite link information subscription request instructing the SMF network element to send, in response to receiving the satellite link information, the satellite link information to the PCF network element.

In some embodiments, the method further includes sending the satellite link information to an application function (AF) network element.

In some embodiments, the method further includes determining a quality of service of an application function (AF) session corresponding to the terminal based on the satellite link information corresponding to the terminal.

A fourth aspect of the present disclosure provides a method of determining satellite link information, which is applied to an application function (AF) network element, including obtaining satellite link information corresponding to a terminal from a policy control function (PCF) network element, wherein the satellite link information includes at least one of satellite access information related to connection of the terminal with an access network node or satellite backhaul information related to connection of the access network node with a corresponding UPF network element.

In some embodiments, the satellite backhaul information includes any one or more of that whether the terminal is currently using satellite backhaul or not, that whether the satellite backhaul currently used by the terminal is changed or not, or that whether the terminal is currently within an area of interest or not, and the satellite access information includes any one or more of that whether the terminal is currently using satellite access or not, that whether the satellite access currently used by the terminal is changed, or that whether the terminal is currently within the area of interest.

A fifth aspect of the present disclosure provides a device for determining satellite link information, which is applied to a user plane functional (UPF) network element, including a determining module, configured to determine the satellite link information corresponding to a terminal based on information of a cell in which the terminal is located and network deployment information corresponding to the UPF network element, wherein the information of the cell includes at least one of an identity of the cell or an identity of an access network node to which the cell belongs, the network deployment information includes first deployment information indicating whether a satellite link is available for connection of the UPF network element with the access network node and second deployment information indicating whether the satellite link is available for connection of the access network node with the terminal, and the satellite link information includes at least one of satellite backhaul information related to the connection of the UPF network element with the access network node or satellite access information related to the connection of the access network node with the terminal.

A sixth aspect of the present disclosure provides a device for determining satellite link information, which is applied to a session management function (SMF) network element, including: an obtaining module, configured to obtain the satellite link information corresponding to a terminal from a user plane function (UPF) network element, wherein the satellite link information includes at least one of satellite access information related to connection of the terminal with an access network node or satellite backhaul information related to connection of the UPF network element with the access network node.

A seventh aspect of the present disclosure provides a device for determining satellite link information, which is applied to a policy control function (PCF) network element, including: an obtaining module, configured to obtain the satellite link information corresponding to a terminal from a session management function (SMF) network element, wherein the satellite link information includes at least one of satellite access information related to connection of the terminal with an access network node or satellite backhaul information related to connection of the access network node with a corresponding UPF network element.

An eighth aspect of the present disclosure provides a device for determining satellite link information, which is applied to an application function (AF) network element, the device including an obtaining module, configured to obtain satellite link information corresponding to a terminal from a policy control function (PCF) network element, wherein the satellite link information includes at least one of satellite access information related to connection of the terminal with an access network node or satellite backhaul information related to connection of the access network node with a corresponding UPF network element.

A ninth aspect of the present disclosure provides a communication device, including a transceiver, a memory and a processor, the processor is connected to the transceiver and the memory respectively, and is configured to, by executing computer-executable instructions on the memory, control transmitting and receiving of wireless signals of the transceiver and implement the method according to the embodiment in the first aspect, or the embodiment in the second aspect, or the embodiment in the third aspect, or the embodiment in the fourth aspect.

A tenth aspect of the present disclosure provides a computer storage medium having computer-executable instructions stored thereon that, when being executed by a processor, can implement the method according to the embodiment in the first aspect, or the embodiment in the second aspect, or the embodiment in the third aspect, or the embodiment in the fourth aspect.

BRIEF DESCRIPTION OF THE DRAWINGS

The foregoing and/or additional aspects and advantages of the present disclosure will become apparent and readily understood from the following description of embodiments in conjunction with the accompanying drawings, in which.

DETAILED DESCRIPTION OF THE PREFERRED EMBODIMENTS

Figure 1:
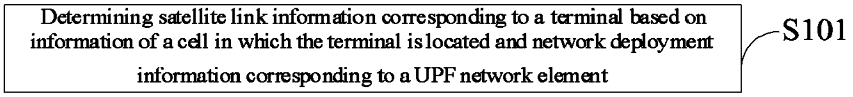
FIG. 1 is a flow diagram of a method for determining satellite link information according to an embodiment of the present disclosure.

Embodiments of the present disclosure are described in detail below, and examples of the embodiments are illustrated in the accompanying drawings, in which the same or similar reference numerals indicate the same or similar elements or elements having the same or similar functions throughout the specification. The embodiments described below with reference to the accompanying drawings are exemplary and are intended to explain the present disclosure, and are not to be construed as limiting the present disclosure.

In the current communication network system, communication between a core network and a mobile terminal may be achieved through a satellite link. However, since the satellite link usually has high latency, if the latency requirements of certain services of the terminal are not met, the services cannot be responded to properly. Therefore, the core network needs to determine satellite link information corresponding to the terminal, so as to configure a suitable quality of service identity for the terminal to meet the service requirement of the terminal. For example, in some special cases, such as when being located in a remote area such as an isolated island, an isolated forest, a mountainous area, the terminal needs to use the satellite link. The satellite link may not be able to respond to certain services in accordance with the stringent low-latency quality of service standard, and thus cannot satisfy the actual demand. In an embodiment of the present disclosure, a suitable quality of service identity may be configured for a terminal in such a situation, thereby ensuring that the services of the terminal can be responded to properly.

FIG. 1 is a flow diagram of a method for determining satellite link information according to an embodiment of the present disclosure. The method is executed by a UPF network element in order to determine the satellite link information corresponding to a terminal. As shown in FIG. 1, the method for determining satellite link information may include:

S101, determining the satellite link information corresponding to a terminal based on information of a cell in which the terminal is located and network deployment information corresponding to the UPF network element.

The information of the cell includes at least one of an identity of the cell or an identity of an access network node to which the cell belongs. The network deployment information includes first deployment information indicating whether a satellite link is available for connection of the UPF network element with the access network node and second deployment information indicating whether the satellite link is available for connection of the access network node with the terminal. The satellite link information includes at least one of satellite backhaul information related to the connection of the UPF network element with the access network node or satellite access information related to the connection of the access network node with the terminal.

In the current mobile communication network system, there may be a variety of network deployment scenarios. For example, in the communication network system in which the satellite link may be used, there may be the following network deployments: a first network deployment, in which the connection between the UPF network element and the access network node may be achieved using the satellite link, and which may be referred to as a satellite backhaul link; a second network deployment, in which the connection between the access network node and the terminal may be achieved using the satellite link, and which may be referred to as a satellite access link; and a third network deployment, in which each of the connection between the UPF network element and the access network node and the connection between the access network node and the terminal may be achieved using the satellite link, and which may be referred to as a satellite backhaul+satellite access link.

In the network deployment in which the satellite link may be used as described above, the UPF network element may determine the satellite link information corresponding to the terminal based on the information of the cell in which the terminal is located and the network deployment information. The information of the cell in which the terminal is located may include the identity of the cell and/or the identity of the access network node (for example, a base station) to which the cell belongs. The network deployment information may indicate a network deployment scenario employed by a network to which the UPF network element belongs, and may include, for example, first deployment information indicating whether the satellite link is available for the connection of the UPF network element with a corresponding access network node or not, and second deployment information indicating whether the satellite link is available for the connection of the access network node with the terminal.

In some embodiments, step S101 may be achieved by:

when the first deployment information indicates that the satellite link is available for the connection of the UPF network element with the access network node, determining the satellite backhaul information corresponding to the terminal based on the information of the cell in which the terminal is located, the satellite backhaul information including any one or more of that whether the terminal is currently using satellite backhaul or not, that whether the satellite backhaul currently used by the terminal is changed or not, or that whether the terminal is currently within an area of interest or not; and/or when the second deployment information indicates that the satellite link is available for the connection of the access network node with the terminal, determining the satellite access information corresponding to the terminal based on the information of the cell in which the terminal is located, the satellite access information including any one or more of that whether the terminal is currently using satellite access or not, that whether the satellite access currently used by the terminal is changed, or that whether the terminal is currently within the area of interest.

When the first deployment information indicates that the satellite link is available for the connection of the UPF network element with the access network node, it indicates that the connection between the UPF network element and the access network node may be achieved using the satellite link, i.e., the terminal may use the satellite backhaul link, in which case the UPF network element may determine the corresponding satellite backhaul information for the terminal. The satellite backhaul information is related to the connection between the access network node to which the terminal is connected and the UPF network element corresponding to the access network node, i.e., it may indicate whether the connection between the access network node to which the terminal is connected and the corresponding UPF network element is currently using the satellite backhaul link, for example, the satellite backhaul information may include any one or more of that whether the terminal is currently using satellite backhaul or not, that whether the satellite backhaul currently used by the terminal is changed or not, or that whether the terminal is currently within an area of interest or not. The area of interest may represent a monitored cell using the satellite link. For example, when the terminal accesses the communication network system through the first network deployment, in which the connection between the base station 1 and the UPF network element may be achieved using the satellite link, the base station 1 covers cells A and B, the cell A is a pre-configured cell using the satellite link, i.e., the cell A is the area of interest, and the cell B is not a cell using the satellite link, if the information of the cell in which the terminal is located indicates that the terminal is currently in the cell A of the base station 1, the UPF network element may determine that the terminal is using the satellite backhaul currently, and if the information of the cell in which the terminal is located indicates that the terminal is currently in the cell B of the base station 1, the UPF network element may determine that the terminal is not using the satellite backhaul currently. For another example, when the terminal accesses the communication network system through the first network deployment, in which the connection between the base station 1 and the UPF network element may be achieved using the satellite link, the base station 1 covers cells A and B, and the cells A and B are pre-configured cells using the satellite link, i.e., both the cells A and B are areas of interest, if the information of the cell in which the terminal is located indicates that the cell in which the terminal is located belongs to the cell covered by the base station, the UPF network element may determine that the terminal is currently using the satellite backhaul.

When the second deployment information indicates that the satellite link is available for the connection of the access network node with the terminal, it indicates that the connection between the access network node and the terminal may be achieved using the satellite link, i.e., the terminal may use the satellite access link, in which case the UPF network element may determine, for the terminal, the corresponding satellite access information thereto. The satellite access information is related to the connection between the access network node to which the terminal is connected and the terminal, i.e., it may indicate whether the connection between the access network node to which the terminal is connected and the terminal is using the satellite access link or not, for example, the satellite access information may include any one or more of that whether the terminal is currently using satellite access or not, that whether the satellite access currently used by the terminal is changed, or that whether the terminal is currently within the area of interest. The area of interest may represent a monitored cell using the satellite access. For example, when the terminal accesses the communication network system through the second network deployment, in which the connection between the base station 1 and the terminal may be achieved by using the satellite link, the base station 1 covers cells A and B, the cell A is a pre-configured cell using the satellite link, i.e., the cell A is the area of interest, and the cell B is not a cell using the satellite link, if the information of the cell in which the terminal is located indicates that the terminal is currently in the cell A of the base station 1, the UPF network element may determine that the terminal is currently using the satellite access, and if the information of the cell in which the terminal is located indicates that the terminal is currently in the cell B of the base station 1, the UPF network element may determine that the terminal is not currently using the satellite access. For another example, when the terminal accesses the communication network system through the second network deployment, in which the connection between the base station 1 and the terminal may be achieved using the satellite link, the base station 1 covers the cells A and B, and the cells A and B are pre-configured cells using the satellite link, i.e., the cells A and B are areas of interest, if the information of the cell in which the terminal is located indicates that the cell in which the terminal is located belongs to the cell covered by the base station 1, the UPF network element may determine that the terminal is currently using the satellite access.

When the first deployment information indicates that the satellite link is available for the connection of the UPF network element with the access network node, and the second deployment information indicates that the satellite link is available for the connection of the access network node with the terminal, it indicates that the connection between the UPF network element and the access network node may be achieved using the satellite link, and the connection between the access network node and the terminal may be also achieved using the satellite link, i.e., the terminal may use the satellite backhaul+satellite access link, in which case the UPF network element may determine, for the terminal, the corresponding satellite backhaul information and satellite access information thereto. For example, when the terminal accesses the communication network system through the third network deployment, in which the connection between the base station 1 and the UPF network element may be achieved using the satellite link and the connection between the base station 1 and the terminal may be achieved using the satellite link, the base station 1 covers cells A and B, the cell A is a pre-configured cell using the satellite link, i.e., the cell A is an area of interest, and the cell B is not a cell using the satellite link, if the information of the cell in which the terminal is located indicates that the terminal is currently in the cell A of the base station 1, the UPF network element may determine that the terminal is currently using the satellite backhaul and the satellite access, and if the information of the cell in which the terminal is located indicates that the terminal is currently in the cell B of the base station 1, the UPF network element may determine that the terminal is not currently using the satellite backhaul and the satellite access. For another example, when the terminal accesses the communication network system through the third network deployment, in which the connection between the base station 1 and the UPF network element may be achieved using the satellite link and the connection between the base station 1 and the terminal may be achieved using the satellite link, the base station 1 covers cells A and B, and both the cells A and B are pre-configured cells using the satellite link, i.e., both the cells A and B are areas of interest, if the information of the cell in which the terminal is located indicates that the cell in which the terminal is located belongs to the cell covered by the base station 1, the UPF network element may determine that the terminal is currently using the satellite backhaul and the satellite access.

In an embodiment of the present disclosure, the satellite link information currently corresponding to the terminal may be determined based on the information of the cell in which the terminal is located and the network deployment information, so that the core network may configure a corresponding quality of service identity for the terminal based on the satellite link information currently corresponding to the terminal to meet the service requirements of the terminal.

Figure 2:
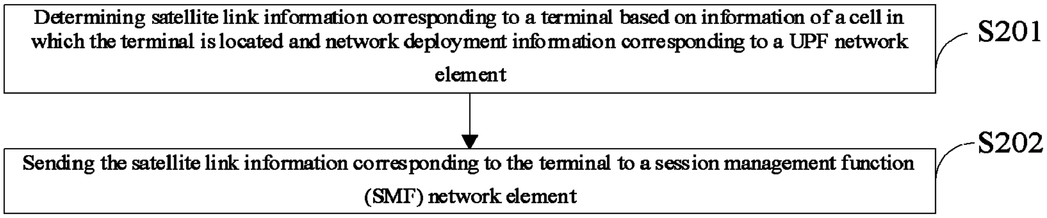
FIG. 2 is a flow diagram of a method for determining satellite link information according to an embodiment of the present disclosure.

FIG. 2 is a flow diagram of a method for determining satellite link information according to an embodiment of the present disclosure. The method is executed by a UPF network element in order to determine the satellite link information corresponding to a terminal. Based on the embodiment shown in FIG. 1, the method for determining satellite link information may include the following steps, as shown in FIG. 2.

In S201, the satellite link information corresponding to a terminal is determined based on information of a cell in which the terminal is located and network deployment information corresponding to the UPF network element.

The information of the cell includes at least one of an identity of the cell or an identity of an access network node to which the cell belongs. The network deployment information includes first deployment information indicating whether a satellite link is available for connection of the UPF network element with the access network node and second deployment information indicating whether the satellite link is available for connection of the access network node with the terminal. The satellite link information includes at least one of satellite backhaul information related to the connection of the UPF network element with the access network node or satellite access information related to the connection of the access network node with the terminal.

In an embodiment of the present disclosure, the specific implementation of step S201 may be referred to the implementation of step S101 shown in FIG. 1 above, which is not repeated in the embodiment of the present disclosure.

In S202, the satellite link information corresponding to the terminal is sent to a session management function (SMF) network element.

After the UPF network element has determined the satellite link information for the terminal, it may send the satellite link information to the SMF network element, so that the SMF network element can also obtain the satellite link information corresponding to the terminal.

In some embodiments, step S202 may be achieved by sending, in response to a packet data unit session establishment request or a packet data unit session modification request from the SMF network element, the satellite link information corresponding to the terminal to the SMF network element.

Figure 3:
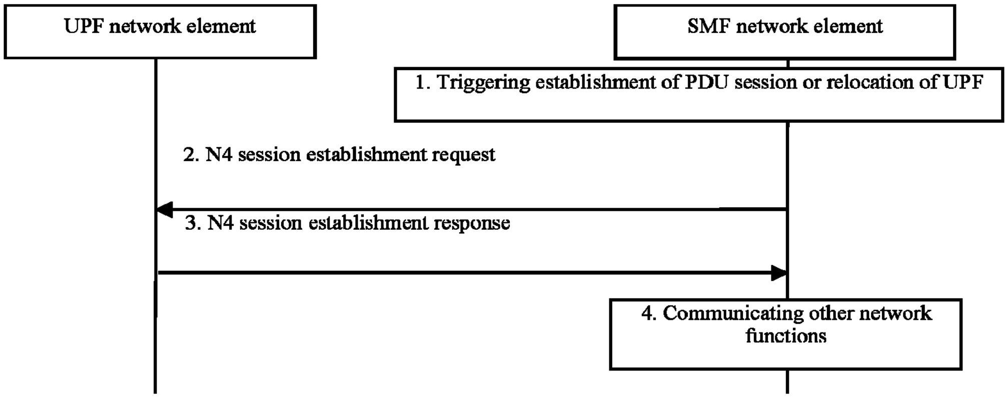
FIG. 3 is a flow diagram of an N4 session establishment process according to an embodiment of the present disclosure.

Referring to FIG. 3, in a session establishment process, e.g., an N4 session establishment process, the SMF network element may trigger establishment of a packet data unit (PDU) session or relocation of the UPF, and send a PDU session establishment request to the UPF network element. The UPF network element sends, in response to the PDU session establishment request (N4 session establishment request), a PDU session establishment response (N4 session establishment response) to the SMF network element, therefore the session establishment is achieved. In an embodiment, the UPF network element may carry the satellite link information corresponding to the terminal in the PDU session establishment response to send the same to the SMF network element, so that the SMF network element obtains the satellite link information of the terminal.

Figure 4:
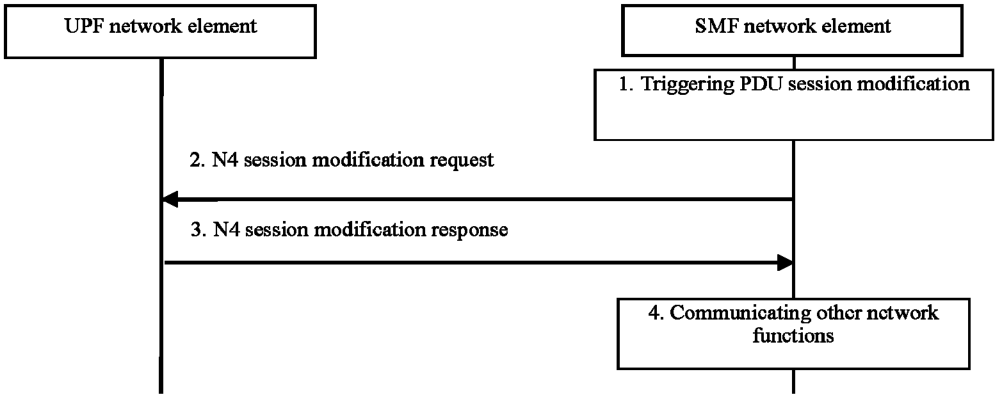
FIG. 4 is a flow diagram of an N4 session modification process according to an embodiment of the present disclosure.

In addition, as shown in FIG. 4, in a session modification process, e.g., an N4 session modification process, the SMF network element may trigger modification of a packet data unit (PDU) session and send a PDU session modification request to the UPF network element. The UPF network element sends, in response to the PDU session modification request (N4 session modification request), a PDU session modification response (N4 session modification response) to the SMF network element, therefore the session modification is achieved. In an embodiment, the UPF network element may carry the satellite link information corresponding to the terminal in the PDU session modification response to send the same to the SMF network element, so that the SMF network element obtains the satellite link information of the terminal.

In an embodiment of the present disclosure, the UPF network element may send the satellite link information determined for the terminal to the SMF network element, so that the SMF network element obtains the satellite link information currently corresponding to the terminal, and thus the core network may configure a corresponding quality of service identity for the terminal according to the satellite link information currently corresponding to the terminal, so as to meet the service requirements of the terminal.

Figure 5:
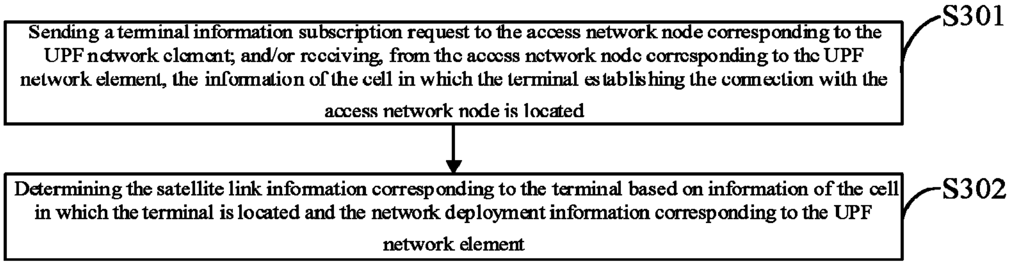
FIG. 5 is a flow diagram of a method for determining satellite link information according to an embodiment of the present disclosure.

FIG. 5 is a flow diagram of a method for determining satellite link information according to an embodiment of the present disclosure. The method is executed by the UPF network element in order to determine the satellite link information corresponding to the terminal. Based on the embodiment shown in FIG. 1, the method for determining satellite link information may include the following steps, as shown in FIG. 5.

In S301, a terminal information subscription request is sent to the access network node corresponding to the UPF network element, the terminal information subscription request instructing the access network node to send, to the UPF network element, the information of the cell in which the terminal establishing the connection with the access network node is located; and/or the information of the cell in which the terminal establishing the connection with the access network node is located is received from the access network node corresponding to the UPF network element.

In an embodiment, the UPF network element may send the terminal information subscription request to the access network node (e.g., a base station), and the terminal information subscription request instructs the access network node to send, to the UPF network element, the information of the cell in which the terminal accessing the communication network system through the access network node is located. The access network node sends, in response to the terminal subscription request, the information of the cell in which the terminal accessing the communication network system through the access network node is located to the UPF network element. In another embodiment, the access network node may actively send, to the UPF network element, the information of the cell in which the terminal accessing the communication network system through the access network node is located.

For example, the UPF network element may send the terminal information subscription request to a base station corresponding thereto in order to obtain, from the base station, the information of the cell in which the terminal establishing the connection with the base station is located. For example, after a base station 1 receives the terminal information subscription request from the UPF network element, if the base station 1 finds that terminals UE1, UE2, and UE3 are in the area covered by the base station 1, for example, UE1 is in cell A of the base station 1, and UE2 and UE3 are in cell B of the base station 1, the base station 1 may send the information of the cell in which UE1, UE2, and UE3 are located to the UPF network element. For example, for UE1, an identity of the base station 1 or an identity of the cell A may be sent to the UPF network element, and for UE2 and UE3, the identity of the base station 1 or an identity of the cell B may be sent to the UPF network element, so that the UPF network element can obtain which terminals are accessing the communication network system through the base station 1.

In S302, the satellite link information corresponding to the terminal is determined based on the information of the cell in which the terminal is located and the network deployment information corresponding to the UPF network element.

The information of the cell includes at least one of an identity of the cell or an identity of an access network node to which the cell belongs. The network deployment information includes first deployment information indicating whether a satellite link is available for connection of the UPF network element with the access network node and second deployment information indicating whether the satellite link is available for connection of the access network node with the terminal. The satellite link information includes at least one of satellite backhaul information related to the connection of the UPF network element with the access network node or satellite access information related to the connection of the access network node with the terminal.

After the information of the cell in which the terminal is located is obtained, the satellite link information may be determined for the terminal based on the information of the cell in which the terminal is located and the network deployment information.

In an embodiment of the present disclosure, the specific implementation of step S302 may refer to the implementation of step S101 shown in FIG. 1 above, which is not repeated in the embodiment of the present disclosure.

In an embodiment of the present disclosure, the UPF network element may obtain the information of the cell in which the terminal is located from the access network node by sending the terminal information subscription request to the access network node, thereby determining the satellite link information currently corresponding to the terminal based on the information of the cell in which the terminal is located and the network deployment information, so that the core network can configure a corresponding quality of service identity for the terminal based on the satellite link information currently corresponding to the terminal, thereby meeting the service requirements of the terminal.

Figure 6:
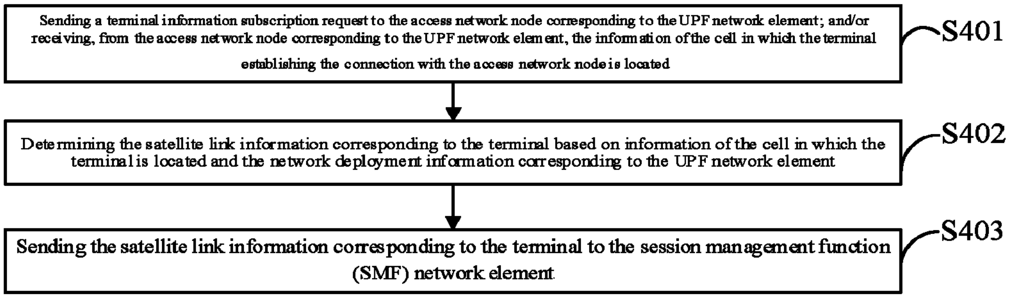
FIG. 6 is a flow diagram of a method for determining satellite link information according to an embodiment of the present disclosure.

FIG. 6 is a flow diagram of a method for determining satellite link information according to an embodiment of the present disclosure. The method is executed by a UPF network element in order to determine the satellite link information corresponding to a terminal. Based on the embodiment shown in FIG. 2, the method for determining satellite link information may include the following steps, as shown in FIG. 6.

In S401, a terminal information subscription request is sent to the access network node corresponding to the UPF network element, the terminal information subscription request instructing the access network node to send, to the UPF network element, the information of the cell in which the terminal establishing the connection with the access network node is located; and/or the information of the cell in which the terminal establishing the connection with the access network node is located is received from the access network node corresponding to the UPF network element.

In an embodiment, the UPF network element may send the terminal information subscription request to the access network node (e.g., a base station), and the terminal information subscription request instructs the access network node to send, to the UPF network element, the information of the cell in which the terminal accessing the communication network system through the access network node is located. The access network node sends, in response to the terminal subscription request, the information of the cell in which the terminal accessing the communication network system through the access network node is located to the UPF network element. In another embodiment, the access network node may actively send, to the UPF network element, the information of the cell in which the terminal accessing the communication network system through the access network node is located.

In S402, the satellite link information corresponding to the terminal is determined based on the information of the cell in which the terminal is located and the network deployment information corresponding to the UPF network element.

The information of the cell includes at least one of an identity of the cell or an identity of an access network node to which the cell belongs. The network deployment information includes first deployment information indicating whether a satellite link is available for connection of the UPF network element with the access network node and second deployment information indicating whether the satellite link is available for connection of the access network node with the terminal. The satellite link information includes at least one of satellite backhaul information related to the connection of the UPF network element with the access network node or satellite access information related to the connection of the access network node with the terminal.

After the information of the cell in which the terminal is located is obtained, the satellite link information may be determined for the terminal based on the information of the cell in which the terminal is located and the network deployment information.

In an embodiment of the present disclosure, the specific implementation of step S402 may refer to the implementation of step S101 shown in FIG. 1 above, which is not repeated in the embodiment of the present disclosure.

In S403, the satellite link information corresponding to the terminal is sent to a session management function (SMF) network element.

After the UPF network element has determined the satellite link information for the terminal, it may send the satellite link information to the SMF network element, so that the SMF network element can also obtain the satellite link information corresponding to the terminal.

In an embodiment of the present disclosure, the specific implementation of step S403 may refer to the implementation of step S202 shown in FIG. 2 above, which is not repeated in the embodiment of the present disclosure.

In an embodiment of the present disclosure, the UPF network element may obtain the information of the cell in which the terminal is located from the access network node by sending the terminal information subscription request to the access network node, determine the satellite link information currently corresponding to the terminal based on the information of the cell in which the terminal is located and the network deployment information, and send the satellite link information determined for the terminal to the SMF network element, and thus the SMF network element can obtain the satellite link information currently corresponding to the terminal, so that the core network can configure a corresponding quality of service identity for the terminal based on the satellite link information currently corresponding to the terminal, thereby meeting the service requirements of the terminal.

Figure 7:
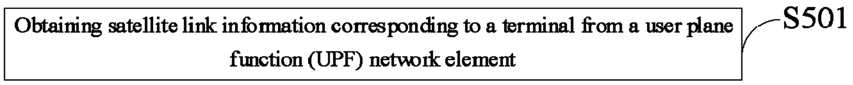
FIG. 7 is a flow diagram of another method for determining satellite link information according to an embodiment of the present disclosure.

FIG. 7 illustrates a flow diagram of a method for determining satellite link information according to an embodiment of the present disclosure. The method is executed by an SMF network element in order to determine the satellite link information corresponding to a terminal. As shown in FIG. 7, the method for determining satellite link information may include:

S501, obtaining the satellite link information corresponding to a terminal from a user plane function (UPF) network element.

The satellite link information includes at least one of satellite access information related to connection of the terminal with an access network node or satellite backhaul information related to connection of the UPF network element with the access network node.

In the current mobile communication network system, there may be a variety of network deployment scenarios. For example, in the communication network system in which the satellite link may be used, there may be the following network deployments: a first network deployment, in which the connection between the UPF network element and the access network node may be achieved using the satellite link, and which may be referred to as a satellite backhaul link; a second network deployment, in which the connection between the access network node and the terminal may be achieved using the satellite link, and which may be referred to as a satellite access link; and a third network deployment, in which each of the connection between the UPF network element and the access network node and the connection between the access network node and the terminal may be achieved using the satellite link, and which may be referred to as a satellite backhaul+satellite access link.

The SMF network element may obtain the satellite link information corresponding to the terminal from the UPF network element, including satellite access information and/or satellite backhaul information. The satellite access information is related to the connection of the terminal with the access network node, i.e., corresponding to the second network deployment scenario described above. The satellite backhaul information is related to the connection of the UPF network element with the access network node, i.e., corresponding to the first network deployment scenario described above. For the third network deployment scenario described above, the satellite link information corresponding to the terminal obtained by the SMF network element may include both the satellite access information and the satellite backhaul information.

In some embodiments, step S501 may be achieved by obtaining the satellite link information from the UPF network element by sending a packet data unit session establishment request or a packet data unit session modification request to the UPF network element.

Referring to FIG. 3, in a session establishment process, e.g., an N4 session establishment process, the SMF network element may trigger establishment of a packet data unit (PDU) session or relocation of the UPF, and send a PDU session establishment request to the UPF network element. The UPF network element sends, in response to the PDU session establishment request (N4 session establishment request), a PDU session establishment response (N4 session establishment response) to the SMF network element, therefore the session establishment is achieved. The UPF network element may carry the satellite link information corresponding to the terminal in the PDU session establishment response to send the same to the SMF network element, so that the SMF network element obtains the satellite link information of the terminal.

In addition, referring to FIG. 4, in a session modification process, e.g., an N4 session modification process, the SMF network element may trigger modification of a packet data unit (PDU) session and send a PDU session modification request to the UPF network element. The UPF network element sends, in response to the PDU session modification request (N4 session modification request), a PDU session modification response (N4 session modification response) to the SMF network element, therefore the session modification is achieved. The UPF network element may carry the satellite link information corresponding to the terminal in the PDU session modification response to send the same to the SMF network element, so that the SMF network element obtains the satellite link information of the terminal.

In an embodiment, the SMF network element obtains the satellite link information currently corresponding to the terminal from the UPF network element via the PDU session establishment request or the PDU session modification request.

In some embodiments, the satellite backhaul information includes any one or more of that whether the terminal is currently using satellite backhaul or not, that whether the satellite backhaul currently used by the terminal is changed or not, or that whether the terminal is currently within an area of interest or not; and the satellite access information includes any one or more of that whether the terminal is currently using satellite access or not, that whether the satellite access currently used by the terminal is changed, or that whether the terminal is currently within the area of interest.

In the first network deployment, the connection between the UPF network element and the access network node may be achieved using the satellite link, i.e., the terminal may use the satellite backhaul link, in which case the SMF network element may obtain the satellite backhaul information corresponding to the terminal from the UPF network element. The satellite backhaul information is related to the connection between the access network node to which the terminal is connected and the UPF network element corresponding to the access network node, i.e., it may indicate whether the connection between the access network node to which the terminal is connected and the corresponding UPF network element is currently using the satellite backhaul link, for example, the satellite backhaul information may include any one or more of that whether the terminal is currently using satellite backhaul or not, that whether the satellite backhaul currently used by the terminal is changed or not, or that whether the terminal is currently within an area of interest or not. The area of interest may represent a monitored cell using the satellite link. For example, when the terminal accesses the communication network system through the first network deployment, in which the connection between the base station 1 and the UPF network element may be achieved using the satellite link, the base station 1 covers cells A and B, the cell A is a pre-configured cell using the satellite link, i.e., the cell A is the area of interest, and the cell B is not a cell using the satellite link, if the information of the cell in which the terminal is located indicates that the terminal is currently in the cell A of the base station 1, the SMF network element may obtain the information indicating that the terminal is currently using the satellite backhaul from the UPF network element, and if the information of the cell in which the terminal is located indicates that the terminal is currently in the cell B of the base station 1, the SMF network element may obtain the information indicating that the terminal is not currently using the satellite backhaul from the UPF network element. For another example, when the terminal accesses the communication network system through the first network deployment, in which the connection between the base station 1 and the UPF network element may be achieved using the satellite link, the base station 1 covers cells A and B, and the cells A and B are pre-configured cells using the satellite link, i.e., both the cells A and B are areas of interest, if the information of the cell in which the terminal is located indicates that the cell in which the terminal is located belongs to the cell covered by the base station, the SMF network element may obtain the information indicating that the terminal is currently using the satellite backhaul from the UPF network element.

In the second network deployment, the connection between the access network node and the terminal may be achieved using the satellite link, i.e., the terminal may use the satellite access link, in which case the SMF network element may obtain the satellite access information corresponding to the terminal from the UPF network element. The satellite access information is related to the connection between the access network node to which the terminal is connected and the terminal, i.e., it may indicate whether the connection between the access network node to which the terminal is connected and the terminal is using the satellite access link or not, for example, the satellite access information may include any one or more of that whether the terminal is currently using satellite access or not, that whether the satellite access currently used by the terminal is changed, or that whether the terminal is currently within the area of interest. The area of interest may represent a monitored cell using the satellite access. For example, when the terminal accesses the communication network system through the second network deployment, in which the connection between the base station 1 and the terminal may be achieved by using the satellite link, the base station 1 covers cells A and B, the cell A is a pre-configured cell using the satellite link, i.e., the cell A is the area of interest, and the cell B is not a cell using the satellite link, if the information of the cell in which the terminal is located indicates that the terminal is currently in the cell A of the base station 1, the SMF network element may obtain the information indicating that the terminal is currently using the satellite access from the UPF network element, and if the information of the cell in which the terminal is located indicates that the terminal is currently in the cell B of the base station 1, the SMF network element may obtain the information indicating that the terminal is not currently using the satellite access from the UPF network element. For another example, when the terminal accesses the communication network system through the second network deployment, in which the connection between the base station 1 and the terminal may be achieved using the satellite link, the base station 1 covers the cells A and B, and the cells A and B are pre-configured cells using the satellite link, i.e., the cells A and B are areas of interest, if the information of the cell in which the terminal is located indicates that the cell in which the terminal is located belongs to the cell covered by the base station 1, the SMF network element may obtain the information indicating that the terminal is currently using the satellite access from the UPF network element.

In the third network deployment, the connection between the UPF network element and the access network node may be achieved using the satellite link, and the connection between the access network node and the terminal may be also achieved using the satellite link, i.e., the terminal may use the satellite backhaul+satellite access link, in which case the SMF network element may obtain the satellite backhaul information and satellite access information corresponding to the terminal from the UPF network element. For example, when the terminal accesses the communication network system through the third network deployment, in which the connection between the base station 1 and the UPF network element may be achieved using the satellite link and the connection between the base station 1 and the terminal may be achieved using the satellite link, the base station 1 covers cells A and B, the cell A is a pre-configured cell using the satellite link, i.e., the cell A is an area of interest, and the cell B is not a cell using the satellite link, if the information of the cell in which the terminal is located indicates that the terminal is currently in the cell A of the base station 1, the SMF network element may obtain the information indicating that the terminal is currently using the satellite backhaul and satellite access from the UPF network element, and if the information of the cell in which the terminal is located indicates that the terminal is currently in the cell B of the base station 1, the SMF network element may obtain the information indicating that the terminal is not currently using the satellite backhaul and the satellite access from the UPF network element. For another example, when the terminal accesses the communication network system through the third network deployment, in which the connection between the base station 1 and the UPF network element may be achieved using the satellite link and the connection between the base station 1 and the terminal may be achieved using the satellite link, the base station 1 covers cells A and B, and both the cells A and B are pre-configured cells using the satellite link, i.e., both the cells A and B are areas of interest, if the information of the cell in which the terminal is located indicates that the cell in which the terminal is located belongs to the cell covered by the base station 1, the SMF network element may obtain the information indicating that the terminal is currently using the satellite backhaul and the satellite access from the UPF network element.

In an embodiment of the present disclosure, the SMF network element can obtain, from the UPF network element, the satellite link information currently corresponding to the terminal, so that the core network can configure a corresponding quality of service identity for the terminal according to the satellite link information currently corresponding to the terminal, thereby meeting the service requirements of the terminal.

Figure 8:
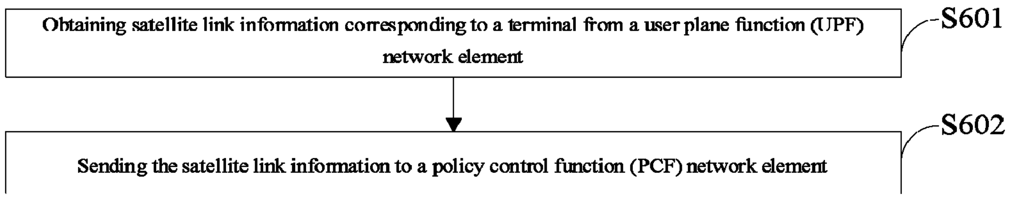
FIG. 8 is a flow diagram of another method for determining satellite link information according to an embodiment of the present disclosure.

FIG. 8 is a flow diagram of a method for determining satellite link information according to an embodiment of the present disclosure. The method is executed by an SMF network element in order to determine the satellite link information corresponding to a terminal. Based on the embodiment shown in FIG. 7, the method for determining satellite link information may include the following steps, as shown in FIG. 8.

In S601, the satellite link information corresponding to a terminal is obtained from a user plane function (UPF) network element.

The satellite link information includes at least one of satellite access information related to connection of the terminal with an access network node or satellite backhaul information related to connection of the UPF network element with the access network node.

In an embodiment of the present disclosure, the specific implementation of step S601 may refer to the implementation of step S501 shown in FIG. 7 above, which will not be repeated in the embodiment of the present disclosure.

In some embodiments, the satellite backhaul information includes any one or more of that whether the terminal is currently using satellite backhaul or not, that whether the satellite backhaul currently used by the terminal is changed or not, or that whether the terminal is currently within an area of interest or not; and the satellite access information includes any one or more of that whether the terminal is currently using satellite access or not, that whether the satellite access currently used by the terminal is changed, or that whether the terminal is currently within the area of interest.

In S602, the satellite link information is sent to a policy control function (PCF) network element.

After obtaining the satellite link information corresponding to the terminal, the SMF network element may send the satellite link information to the PCF network element so that the PCF network element can also obtain the satellite link information corresponding to the terminal.

In an embodiment of the present disclosure, the SMF network element can obtain the satellite link information currently corresponding to the terminal from the UPF network element and send the satellite link information to the PCF network element, so that the PCF network element can obtain the satellite link information corresponding to the terminal, and thus the core network can configure a corresponding quality of service identity for the terminal based on the satellite link information currently corresponding to the terminal, thereby meeting the service requirements of the terminal.

Figure 9:
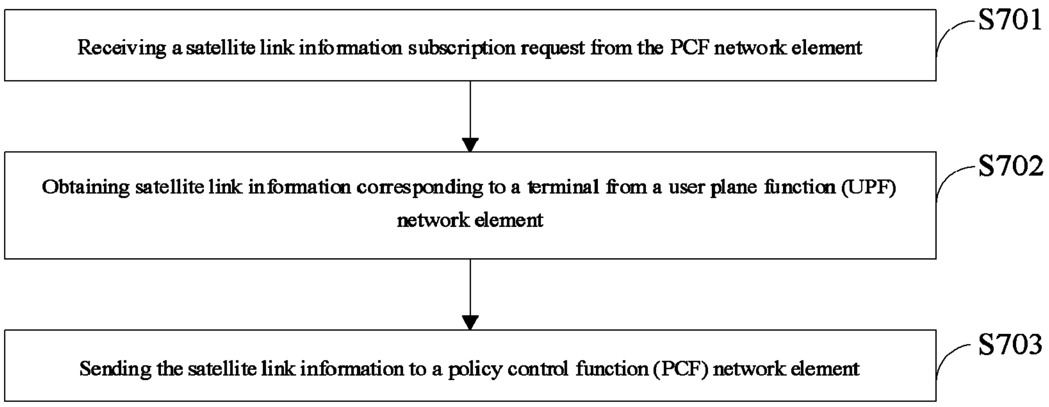
FIG. 9 is a flow diagram of another method for determining satellite link information according to an embodiment of the present disclosure.

FIG. 9 is a flow diagram of a method for determining satellite link information according to an embodiment of the present disclosure. The method is executed by an SMF network element in order to determine the satellite link information corresponding to a terminal. Based on the embodiment shown in FIG. 8, the method for determining satellite link information may include the following steps, as shown in FIG. 9.

In S701, a satellite link information subscription request is received from the PCF network element, the satellite link information subscription request instructing the SMF network element to send, in response to receiving the satellite link information, the satellite link information to the PCF network element.

In an embodiment, the SMF network element may receive the satellite link information subscription request from the PCF network element, and the request instructs the SMF network element to send the satellite link information to the PCF network element after receiving the satellite link information, so that the PCF network element can obtain the satellite link information corresponding to the terminal in a timely manner, so as to configure the terminal with an appropriate quality of service identity in a timely manner.

In S702, the satellite link information corresponding to the terminal is obtained from a user plane function (UPF) network element.

The satellite link information includes at least one of satellite access information related to connection of the terminal with an access network node or satellite backhaul information related to connection of the UPF network element with the access network node.

In an embodiment of the present disclosure, the specific implementation of step S702 may refer to the implementation of step S501 shown in FIG. 7 above, which will not be repeated in the embodiment of the present disclosure.

It should be noted that the order of executions of the above steps S701 and S702 is not limited to that shown in the embodiment. In other embodiments, S702 may be executed first and then S701 is executed, which is not limited in the present disclosure.

In some embodiments, the satellite backhaul information includes any one or more of that whether the terminal is currently using satellite backhaul or not, that whether the satellite backhaul currently used by the terminal is changed or not, or that whether the terminal is currently within an area of interest or not; and the satellite access information includes any one or more of that whether the terminal is currently using satellite access or not, that whether the satellite access currently used by the terminal is changed, or that whether the terminal is currently within the area of interest.

In S703, the satellite link information is sent to a policy control function (PCF) network element.

After obtaining the satellite link information corresponding to the terminal, the SMF network element may send the satellite link information to the PCF network element so that the PCF network element can also obtain the satellite link information corresponding to the terminal.

In an embodiment of the present disclosure, the SMF network element can obtain the satellite link information currently corresponding to the terminal from the UPF network element and send the satellite link information to the PCF network element, so that the PCF network element can obtain the satellite link information corresponding to the terminal, and thus the core network can configure a corresponding quality of service identity for the terminal based on the satellite link information currently corresponding to the terminal, thereby meeting the service requirements of the terminal.

Figure 10:
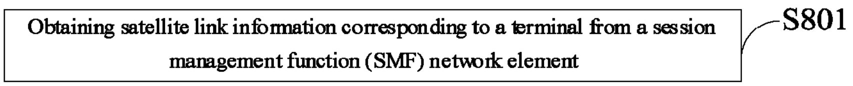
FIG. 10 is a flow diagram of yet another method for determining satellite link information according to an embodiment of the present disclosure.

FIG. 10 is a flow diagram of a method for determining satellite link information according to an embodiment of the present disclosure. The method is performed by a PCF network element in order to determine the satellite link information corresponding to a terminal. As shown in FIG. 10, the method for determining satellite link information may include:

S801, obtaining the satellite link information corresponding to a terminal from a session management function (SMF) network element.

The satellite link information includes at least one of satellite access information related to connection of the terminal with an access network node or satellite backhaul information related to connection of the access network node with a corresponding UPF network element.

In the current mobile communication network system, there may be a variety of network deployment scenarios. For example, in the communication network system in which the satellite link may be used, there may be the following network deployments: a first network deployment, in which the connection between the UPF network element and the access network node may be achieved using the satellite link, and which may be referred to as a satellite backhaul link; a second network deployment, in which the connection between the access network node and the terminal may be achieved using the satellite link, and which may be referred to as a satellite access link; and a third network deployment, in which each of the connection between the UPF network element and the access network node and the connection between the access network node and the terminal may be achieved using the satellite link, and which may be referred to as a satellite backhaul+satellite access link.

The PCF network element may obtain the satellite link information corresponding to the terminal from the SMF network element, including satellite access information and/or satellite backhaul information. The satellite access information is related to the connection of the terminal with the access network node, i.e., corresponding to the second network deployment scenario described above. The satellite backhaul information is related to the connection of the UPF network element with the access network node, i.e., corresponding to the first network deployment scenario described above. For the third network deployment scenario described above, the satellite link information corresponding to the terminal obtained by the PCF network element may include both the satellite access information and the satellite backhaul information.

In some embodiments, the satellite backhaul information includes any one or more of that whether the terminal is currently using satellite backhaul or not, that whether the satellite backhaul currently used by the terminal is changed or not, or that whether the terminal is currently within an area of interest or not; and the satellite access information includes any one or more of that whether the terminal is currently using satellite access or not, that whether the satellite access currently used by the terminal is changed, or that whether the terminal is currently within the area of interest.

In the first network deployment, the connection between the UPF network element and the access network node may be achieved using the satellite link, i.e., the terminal may use the satellite backhaul link, in which case the PCF network element may obtain the satellite backhaul information corresponding to the terminal from the SMF network element. The satellite backhaul information is related to the connection between the access network node to which the terminal is connected and the UPF network element corresponding to the access network node, i.e., it may indicate whether the connection between the access network node to which the terminal is connected and the corresponding UPF network element is currently using the satellite backhaul link, for example, the satellite backhaul information may include any one or more of that whether the terminal is currently using satellite backhaul or not, that whether the satellite backhaul currently used by the terminal is changed or not, or that whether the terminal is currently within an area of interest or not. The area of interest may represent a monitored cell using the satellite link. For example, when the terminal accesses the communication network system through the first network deployment, in which the connection between the base station 1 and the UPF network element may be achieved using the satellite link, the base station 1 covers cells A and B, the cell A is a pre-configured cell using the satellite link, i.e., the cell A is the area of interest, and the cell B is not a cell using the satellite link, if the information of the cell in which the terminal is located indicates that the terminal is currently in the cell A of the base station 1, the PCF network element may obtain the information indicating that the terminal is currently using the satellite backhaul from the SMF network element, and if the information of the cell in which the terminal is located indicates that the terminal is currently in the cell B of the base station 1, the PCF network element may obtain the information indicating that the terminal is not currently using the satellite backhaul from the SMF network element. For another example, when the terminal accesses the communication network system through the first network deployment, in which the connection between the base station 1 and the UPF network element may be achieved using the satellite link, the base station 1 covers cells A and B, and the cells A and B are pre-configured cells using the satellite link, i.e., both the cells A and B are areas of interest, if the information of the cell in which the terminal is located indicates that the cell in which the terminal is located belongs to the cell covered by the base station 1, the PCF network element may obtain the information indicating that the terminal is currently using the satellite backhaul from the SMF network element.

In the second network deployment, the connection between the access network node and the terminal may be achieved using the satellite link, i.e., the terminal may use the satellite access link, in which case the PCF network element may obtain the satellite access information corresponding to the terminal from the SMF network element. The satellite access information is related to the connection between the access network node to which the terminal is connected and the terminal, i.e., it may indicate whether the connection between the access network node to which the terminal is connected and the terminal is using the satellite access link or not, for example, the satellite access information may include any one or more of that whether the terminal is currently using satellite access or not, that whether the satellite access currently used by the terminal is changed, or that whether the terminal is currently within the area of interest. The area of interest may represent a monitored cell using the satellite access. For example, when the terminal accesses the communication network system through the second network deployment, in which the connection between the base station 1 and the terminal may be achieved by using the satellite link, the base station 1 covers cells A and B, the cell A is a pre-configured cell using the satellite link, i.e., the cell A is the area of interest, and the cell B is not a cell using the satellite link, if the information of the cell in which the terminal is located indicates that the terminal is currently in the cell A of the base station 1, the PCF network element may obtain the information indicating that the terminal is currently using the satellite access from the SMF network element, and if the information of the cell in which the terminal is located indicates that the terminal is currently in the cell B of the base station 1, the PCF network element may obtain the information indicating that the terminal is not currently using the satellite access from the SMF network element. For another example, when the terminal accesses the communication network system through the second network deployment, in which the connection between the base station 1 and the terminal may be achieved using the satellite link, the base station 1 covers the cells A and B, and the cells A and B are pre-configured cells using the satellite link, i.e., the cells A and B are areas of interest, if the information of the cell in which the terminal is located indicates that the cell in which the terminal is located belongs to the cell covered by the base station 1, the PCF network element may obtain the information indicating that the terminal is currently using the satellite access from the SMF network element.

In the third network deployment, the connection between the UPF network element and the access network node may be achieved using the satellite link, and the connection between the access network node and the terminal may be also achieved using the satellite link, i.e., the terminal may use the satellite backhaul+satellite access link, in which case the PCF network element may obtain the satellite backhaul information and satellite access information corresponding to the terminal from the SMF network element. For example, when the terminal accesses the communication network system through the third network deployment, in which the connection between the base station 1 and the UPF network element may be achieved using the satellite link and the connection between the base station 1 and the terminal may be achieved using the satellite link, the base station 1 covers cells A and B, the cell A is a pre-configured cell using the satellite link, i.e., the cell A is an area of interest, and the cell B is not a cell using the satellite link, if the information of the cell in which the terminal is located indicates that the terminal is currently in the cell A of the base station 1, the PCF network element may obtain the information indicating that the terminal is currently using the satellite backhaul and satellite access from the SMF network element, and if the information of the cell in which the terminal is located indicates that the terminal is currently in the cell B of the base station 1, the PCF network element may obtain the information indicating that the terminal is not currently using the satellite backhaul and the satellite access from the SMF network element. For another example, when the terminal accesses the communication network system through the third network deployment, in which the connection between the base station 1 and the UPF network element may be achieved using the satellite link and the connection between the base station 1 and the terminal may be achieved using the satellite link, the base station 1 covers cells A and B, and both the cells A and B are pre-configured cells using the satellite link, i.e., both the cells A and B are areas of interest, if the information of the cell in which the terminal is located indicates that the cell in which the terminal is located belongs to the cell covered by the base station 1, the PCF network element may obtain the information indicating that the terminal is currently using the satellite backhaul and the satellite access from the SMF network element.

In an embodiment of the present disclosure, the PCF network element may obtain, from the SMF network element, the satellite link information currently corresponding to the terminal, so that it can configure a corresponding quality of service identity for the terminal according to the satellite link information currently corresponding to the terminal, thereby meeting the service requirements of the terminal.

Figure 11:
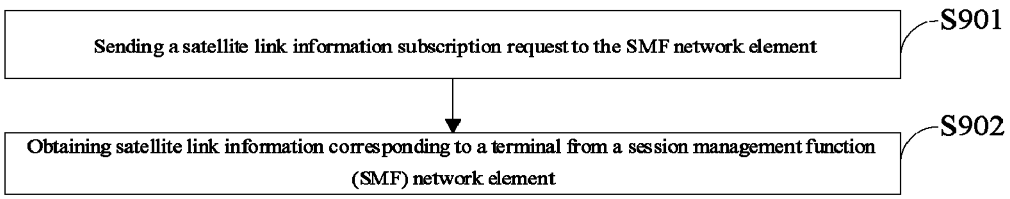
FIG. 11 is a flow diagram of yet another method for determining satellite link information according to an embodiment of the present disclosure.

FIG. 11 is a flow diagram of a method for determining satellite link information according to an embodiment of the present disclosure. The method is executed by a PCF network element in order to determine the satellite link information corresponding to a terminal. Based on the embodiment shown in FIG. 10, the method for determining satellite link information may include the following steps, as shown in FIG. 11.

In S901, a satellite link information subscription request is sent to the SMF network element, the satellite link information subscription request instructing the SMF network element to send, in response to receiving the satellite link information, the satellite link information to the PCF network element.

In an embodiment, the PCF network element may send the satellite link information subscription request to the SMF network element, and the request instructs the SMF network element to send the satellite link information to the PCF network element after receiving the satellite link information, so that the PCF network element can obtain the satellite link information corresponding to the terminal in time so as to configure an appropriate quality of service identity for the terminal in time.

In S902, the satellite link information corresponding to the terminal is obtained from the session management function (SMF) network element.

The satellite link information includes at least one of satellite access information related to connection of the terminal with an access network node or satellite backhaul information related to connection of the access network node with a corresponding UPF network element.

In the embodiment of the present disclosure, the specific implementation of step S902 may refer to the implementation of step S801 shown in FIG. 10 above, which will not be repeated in the embodiment of the present disclosure.

In some embodiments, the satellite backhaul information includes any one or more of that whether the terminal is currently using satellite backhaul or not, that whether the satellite backhaul currently used by the terminal is changed or not, or that whether the terminal is currently within an area of interest or not; and the satellite access information includes any one or more of that whether the terminal is currently using satellite access or not, that whether the satellite access currently used by the terminal is changed, or that whether the terminal is currently within the area of interest.

In an embodiment of the present disclosure, the PCF network element may obtain the satellite link information currently corresponding to the terminal from the SMF network element through the satellite link information subscription request, so that it can configure a corresponding quality of service identity for the terminal based on the satellite link information currently corresponding to the terminal, thereby meeting the service requirements of the terminal.

Figure 12:
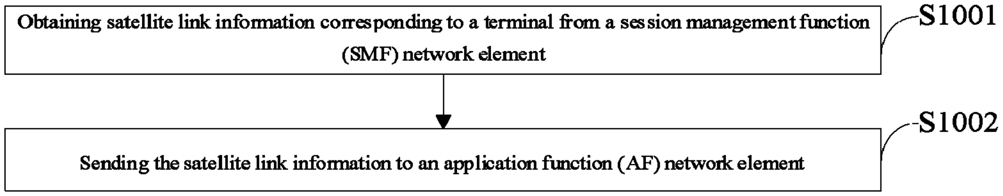
FIG. 12 is a flow diagram of yet another method for determining satellite link information according to an embodiment of the present disclosure.

FIG. 12 illustrates a flow diagram of a method for determining satellite link information according to an embodiment of the present disclosure. The method is executed by a PCF network element in order to determine the satellite link information corresponding to a terminal. Based on the embodiment shown in FIG. 10, the method for determining satellite link information may include the following steps, as shown in FIG. 12.

In S1001, the satellite link information corresponding to a terminal is obtained from a session management function (SMF) network element.

The satellite link information includes at least one of satellite access information related to connection of the terminal with an access network node or satellite backhaul information related to connection of the access network node with a corresponding UPF network element.

In an embodiment of the present disclosure, the specific implementation of step S1001 may refer to the implementation of step S801 shown in FIG. 10 above, which will not be repeated in the embodiment of the present disclosure.

In some embodiments, the satellite backhaul information includes any one or more of that whether the terminal is currently using satellite backhaul or not, that whether the satellite backhaul currently used by the terminal is changed or not, or that whether the terminal is currently within an area of interest or not; and the satellite access information includes any one or more of that whether the terminal is currently using satellite access or not, that whether the satellite access currently used by the terminal is changed, or that whether the terminal is currently within the area of interest.

In S1002, the satellite link information is sent to an application function (AF) network element.

After obtaining the satellite link information corresponding to the terminal, the PCF network element may send the satellite link information to the AF network element so that the AF network element can also obtain the satellite link information corresponding to the terminal.

In an embodiment of the present disclosure, the PCF network element can obtain the satellite link information currently corresponding to the terminal from the SMF network element and send the satellite link information to the AF network element, so that the AF network element can obtain the satellite link information corresponding to the terminal.

In addition, based on the embodiment shown in FIG. 11, the method for determining the satellite link information may further include sending a satellite link information subscription request to the SMF network element, the satellite link information subscription request instructing the SMF network element to send, in response to receiving the satellite link information, the satellite link information to the PCF network element. This step may refer to the implementation manner of step S901 shown in FIG. 11 above, which will not be repeated in the embodiment of the present disclosure.

Figure 13:
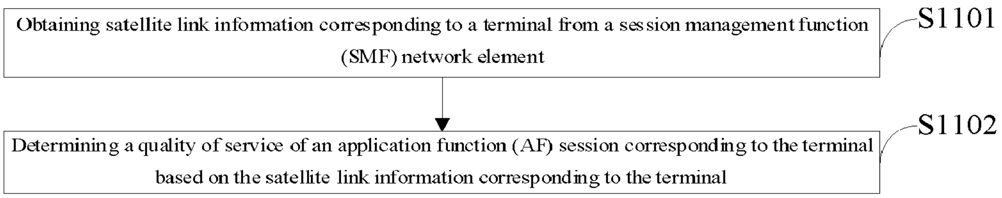
FIG. 13 is a flow diagram of yet another method for determining satellite link information according to an embodiment of the present disclosure.

FIG. 13 illustrates a flow diagram of a method for determining satellite link information according to an embodiment of the present disclosure. The method is performed by a PCF network element in order to determine the satellite link information corresponding to a terminal. Based on the embodiment shown in FIG. 10, the method for determining satellite link information may include the following steps, as shown in FIG. 13.

In S1101, the satellite link information corresponding to a terminal is obtained from a session management function (SMF) network element.

The satellite link information includes at least one of satellite access information related to connection of the terminal with an access network node or satellite backhaul information related to connection of the access network node with a corresponding UPF network element.

In an embodiment of the present disclosure, the specific implementation of step S1101 may refer to the implementation of step S801 shown in FIG. 10 above, which will not be repeated in the embodiment of the present disclosure.

In some embodiments, the satellite backhaul information includes any one or more of that whether the terminal is currently using satellite backhaul or not, that whether the satellite backhaul currently used by the terminal is changed or not, or that whether the terminal is currently within an area of interest or not; and the satellite access information includes any one or more of that whether the terminal is currently using satellite access or not, that whether the satellite access currently used by the terminal is changed, or that whether the terminal is currently within the area of interest.

In S1102, a quality of service of an application function (AF) session corresponding to the terminal is determined based on the satellite link information corresponding to the terminal.

After obtaining the satellite link information corresponding to the terminal, the PCF network element can determine the quality of service of the AF session of the terminal based on the satellite link information.

In an embodiment of the present disclosure, the PCF network element can obtain, from the SMF network element, the satellite link information currently corresponding to the terminal and determine the quality of service of the AF session of the terminal based on the satellite link information, so that it can configure the corresponding quality of service identity for the terminal based on the satellite link information currently corresponding to the terminal, thereby meeting the service requirements of the terminal.

Furthermore, based on the embodiment shown in FIG. 11, the method for determining satellite link information may further include sending a satellite link information subscription request to the SMF network element, the satellite link information subscription request instructing the SMF network element to send, in response to receiving the satellite link information, the satellite link information to the PCF network element. This step may refer to the implementation manner of step S901 shown in FIG. 11 above, which will not be repeated in the embodiment of the present disclosure.

Furthermore, based on the embodiment shown in FIG. 12, the method for determining satellite link information may further include sending the satellite link information to an application function (AF) network element. This step may refer to the implementation manner of step S1002 shown in FIG. 12 above, which will not be repeated in the embodiment of the present disclosure.

Figure 14:
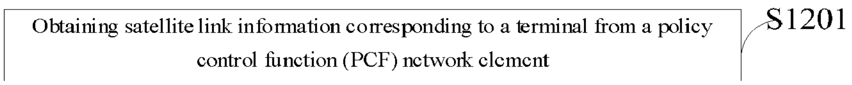
FIG. 14 is a flow diagram of further another method for determining satellite link information according to an embodiment of the present disclosure.

FIG. 14 is a flow diagram of a method for determining satellite link information according to an embodiment of the present disclosure. The method is executed by an AF network element in order to determine the satellite link information corresponding to a terminal. As shown in FIG. 14, the method for determining satellite link information may include:

S1201, obtaining satellite link information corresponding to a terminal from a policy control function (PCF) network element.

The satellite link information includes at least one of satellite access information related to connection of the terminal with an access network node or satellite backhaul information related to connection of the access network node with a corresponding UPF network element.

In the current mobile communication network system, there may be a variety of network deployment scenarios. For example, in the communication network system in which the satellite link may be used, there may be the following network deployments: a first network deployment, in which the connection between the UPF network element and the access network node may be achieved using the satellite link, and which may be referred to as a satellite backhaul link; a second network deployment, in which the connection between the access network node and the terminal may be achieved using the satellite link, and which may be referred to as a satellite access link; and a third network deployment, in which each of the connection between the UPF network element and the access network node and the connection between the access network node and the terminal may be achieved using the satellite link, and which may be referred to as a satellite backhaul+satellite access link.

The AF network element may obtain the satellite link information corresponding to the terminal from the PCF network element, including satellite access information and/or satellite backhaul information. The satellite access information is related to the connection of the terminal with the access network node, i.e., corresponding to the second network deployment scenario described above. The satellite backhaul information is related to the connection of the UPF network element with the access network node, i.e., corresponding to the first network deployment scenario described above. For the third network deployment scenario described above, the satellite link information corresponding to the terminal obtained by the PCF network element may include both the satellite access information and the satellite backhaul information.

In some embodiments, the satellite backhaul information includes any one or more of that whether the terminal is currently using satellite backhaul or not, that whether the satellite backhaul currently used by the terminal is changed or not, or that whether the terminal is currently within an area of interest or not; and the satellite access information includes any one or more of that whether the terminal is currently using satellite access or not, that whether the satellite access currently used by the terminal is changed, or that whether the terminal is currently within the area of interest.

In the first network deployment, the connection between the UPF network element and the access network node may be achieved using the satellite link, i.e., the terminal may use the satellite backhaul link, in which case the AF network element may obtain the satellite backhaul information corresponding to the terminal from the PCF network element. The satellite backhaul information is related to the connection between the access network node to which the terminal is connected and the UPF network element corresponding to the access network node, i.e., it may indicate whether the connection between the access network node to which the terminal is connected and the corresponding UPF network element is currently using the satellite backhaul link, for example, the satellite backhaul information may include any one or more of that whether the terminal is currently using satellite backhaul or not, that whether the satellite backhaul currently used by the terminal is changed or not, or that whether the terminal is currently within an area of interest or not. The area of interest may represent a monitored cell using the satellite link. For example, when the terminal accesses the communication network system through the first network deployment, in which the connection between the base station 1 and the UPF network element may be achieved using the satellite link, the base station 1 covers cells A and B, the cell A is a pre-configured cell using the satellite link, i.e., the cell A is the area of interest, and the cell B is not a cell using the satellite link, if the information of the cell in which the terminal is located indicates that the terminal is currently in the cell A of the base station 1, the AF network element may obtain the information indicating that the terminal is currently using the satellite backhaul from the PCF network element, and if the information of the cell in which the terminal is located indicates that the terminal is currently in the cell B of the base station 1, the AF network element may obtain the information indicating that the terminal is not currently using the satellite backhaul from the PCF network element. For another example, when the terminal accesses the communication network system through the first network deployment, in which the connection between the base station 1 and the UPF network element may be achieved using the satellite link, the base station 1 covers cells A and B, and the cells A and B are pre-configured cells using the satellite link, i.e., both the cells A and B are areas of interest, if the information of the cell in which the terminal is located indicates that the cell in which the terminal is located belongs to the cell covered by the base station 1, the AF network element may obtain the information indicating that the terminal is currently using the satellite backhaul from the PCF network element.

In the second network deployment, the connection between the access network node and the terminal may be achieved using the satellite link, i.e., the terminal may use the satellite access link, in which case the AF network element may obtain the satellite access information corresponding to the terminal from the PCF network element. The satellite access information is related to the connection between the access network node to which the terminal is connected and the terminal, i.e., it may indicate whether the connection between the access network node to which the terminal is connected and the terminal is using the satellite access link or not, for example, the satellite access information may include any one or more of that whether the terminal is currently using satellite access or not, that whether the satellite access currently used by the terminal is changed, or that whether the terminal is currently within the area of interest. The area of interest may represent a monitored cell using the satellite access. For example, when the terminal accesses the communication network system through the second network deployment, in which the connection between the base station 1 and the terminal may be achieved by using the satellite link, the base station 1 covers cells A and B, the cell A is a pre-configured cell using the satellite link, i.e., the cell A is the area of interest, and the cell B is not a cell using the satellite link, if the information of the cell in which the terminal is located indicates that the terminal is currently in the cell A of the base station 1, the AF network element may obtain the information indicating that the terminal is currently using the satellite access from the PCF network element, and if the information of the cell in which the terminal is located indicates that the terminal is currently in the cell B of the base station 1, the AF network element may obtain the information indicating that the terminal is not currently using the satellite access from the PCF network element. For another example, when the terminal accesses the communication network system through the second network deployment, in which the connection between the base station 1 and the terminal may be achieved using the satellite link, the base station 1 covers the cells A and B, and the cells A and B are pre-configured cells using the satellite link, i.e., the cells A and B are areas of interest, if the information of the cell in which the terminal is located indicates that the cell in which the terminal is located belongs to the cell covered by the base station 1, the AF network element may obtain the information indicating that the terminal is currently using the satellite access from the PCF network element.

In the third network deployment, the connection between the UPF network element and the access network node may be achieved using the satellite link, and the connection between the access network node and the terminal may be also achieved using the satellite link, i.e., the terminal may use the satellite backhaul+satellite access link, in which case the AF network element may obtain the satellite backhaul information and satellite access information corresponding to the terminal from the PCF network element. For example, when the terminal accesses the communication network system through the third network deployment, in which the connection between the base station 1 and the UPF network element may be achieved using the satellite link and the connection between the base station 1 and the terminal may be achieved using the satellite link, the base station 1 covers cells A and B, the cell A is a pre-configured cell using the satellite link, i.e., the cell A is an area of interest, and the cell B is not a cell using the satellite link, if the information of the cell in which the terminal is located indicates that the terminal is currently in the cell A of the base station 1, the AF network element may obtain the information indicating that the terminal is currently using the satellite backhaul and satellite access from the PCF network element, and if the information of the cell in which the terminal is located indicates that the terminal is currently in the cell B of the base station 1, the AF network element may obtain the information indicating that the terminal is not currently using the satellite backhaul and the satellite access from the PCF network element. For another example, when the terminal accesses the communication network system through the third network deployment, in which the connection between the base station 1 and the UPF network element may be achieved using the satellite link and the connection between the base station 1 and the terminal may be achieved using the satellite link, the base station 1 covers cells A and B, and both the cells A and B are pre-configured cells using the satellite link, i.e., both the cells A and B are areas of interest, if the information of the cell in which the terminal is located indicates that the cell in which the terminal is located belongs to the cell covered by the base station 1, the AF network element may obtain the information indicating that the terminal is currently using the satellite backhaul and the satellite access from the PCF network element.

In an embodiment of the present disclosure, the AF network element may obtain, from the PCF network element, the satellite link information currently corresponding to the terminal.

Corresponding to the method for determining satellite link information provided in the above several embodiments, the present disclosure also provides a device for determining satellite link information. Since the device for determining satellite link information provided in the embodiment of the present disclosure corresponds to the method for determining satellite link information provided in the above several embodiments, the implementation manner of the method for determining the satellite link information is also applicable to the device for determining satellite link information provided in the present embodiment, which will not be described in detail in the embodiment. FIGS. 15 to 23 are schematic diagrams of a structure of a device for determining satellite link information according to the present disclosure.

Figure 15:
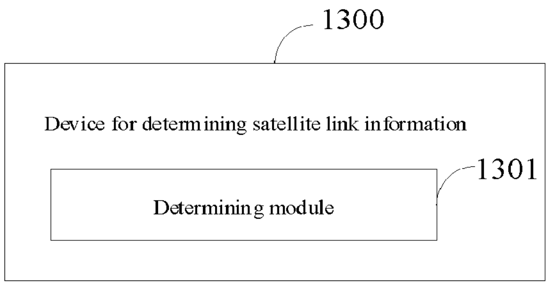
FIG. 15 is a schematic diagram of a structure of a device for determining satellite link information according to an embodiment of the present disclosure.

FIG. 15 is a schematic diagram of a structure of a device for determining satellite link information in an embodiment of the present disclosure. The device is applied to a user plane function (UPF) network element.

As shown in FIG. 15, the device 1300 for determining satellite link information includes:

- a determining module 1301, configured to determine the satellite link information corresponding to a terminal based on information of a cell in which the terminal is located and network deployment information corresponding to the UPF network element.

The information of the cell includes at least one of an identity of the cell or an identity of an access network node to which the cell belongs, the network deployment information includes first deployment information indicating whether a satellite link is available for connection of the UPF network element with the access network node and second deployment information indicating whether the satellite link is available for connection of the access network node with the terminal, and the satellite link information includes at least one of satellite backhaul information related to the connection of the UPF network element with the access network node or satellite access information related to the connection of the access network node with the terminal.

In an embodiments of the present disclosure, the satellite link information currently corresponding to the terminal may be determined based on the information of the cell in which the terminal is located and the network deployment information, so that the core network can configure a corresponding quality of service identity for the terminal based on the satellite link information currently corresponding to the terminal, thereby meeting the service requirements of the terminal.

In some embodiments, the determining module 1301 may be configured to: when the first deployment information indicates that the satellite link is available for the connection of the UPF network element with the access network node, determine the satellite backhaul information corresponding to the terminal based on the information of the cell in which the terminal is located, the satellite backhaul information including any one or more of that whether the terminal is currently using satellite backhaul or not, that whether the satellite backhaul currently used by the terminal is changed or not, or that whether the terminal is currently within an area of interest or not; and/or when the second deployment information indicates that the satellite link is available for the connection of the access network node with the terminal, determine the satellite access information corresponding to the terminal based on the information of the cell in which the terminal is located, the satellite access information including any one or more of that whether the terminal is currently using satellite access or not, that whether the satellite access currently used by the terminal is changed, or that whether the terminal is currently within the area of interest.

Figure 16:
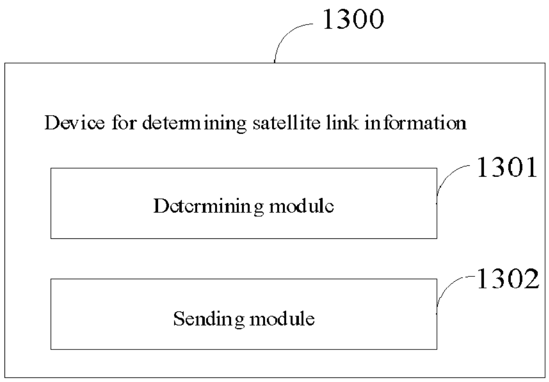
FIG. 16 is a schematic diagram of a structure of a device for determining satellite link information according to an embodiment of the present disclosure.

In some embodiments, as shown in FIG. 16, the device 1300 for determining satellite link information further includes:

a sending module 1302, configured to send the satellite link information corresponding to the terminal to a session management function (SMF) network element.

In some embodiments, the sending module 1302 may be configured to send, in response to a packet data unit session establishment request or a packet data unit session modification request from the SMF network element, the satellite link information corresponding to the terminal to the SMF network element.

Figure 17:
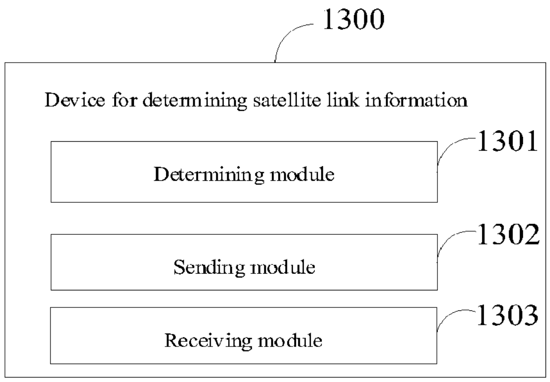
FIG. 17 is a schematic diagram of a structure of a device for determining satellite link information according to an embodiment of the present disclosure.

In some embodiments, the device 1300 for determining satellite link information further includes a receiving module 1303, as shown in FIG. 17.

The sending module 1302 may be configured to send a terminal information subscription request to the access network node corresponding to the UPF network element, the terminal information subscription request instructing the access network node to send, to the UPF network element, the information of the cell in which the terminal establishing the connection with the access network node is located.

The receiving module 1303 is configured to receive, from the access network node corresponding to the UPF network element, the information of the cell in which the terminal establishing the connection with the access network node is located.

Figure 18:
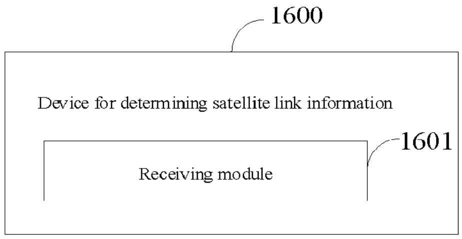
FIG. 18 is a schematic diagram of a structure of another device for determining satellite link information according to an embodiment of the present disclosure.

FIG. 18 is a schematic diagram of a structure of a device for determining satellite link information in an embodiment of the present disclosure. The device is applied to a session management function (SMF) network element.

As shown in FIG. 18, the device 1600 for determining satellite link information includes:

a receiving module 1601, configured to obtain the satellite link information corresponding to a terminal from a user plane function (UPF) network element.

The satellite link information includes at least one of satellite access information related to connection of the terminal with an access network node or satellite backhaul information related to connection of the UPF network element with the access network node.

In an embodiment of the present disclosure, the SMF network element can obtain the satellite link information currently corresponding to the terminal from the UPF network element, so that the core network can configure a corresponding quality of service identity for the terminal based on the satellite link information currently corresponding to the terminal, thereby meeting the service requirements of the terminal.

In some embodiments, the satellite backhaul information includes any one or more of that whether the terminal is currently using satellite backhaul or not, that whether the satellite backhaul currently used by the terminal is changed or not, or that whether the terminal is currently within an area of interest or not; and the satellite access information includes any one or more of that whether the terminal is currently using satellite access or not, that whether the satellite access currently used by the terminal is changed, or that whether the terminal is currently within the area of interest.

Figure 19:
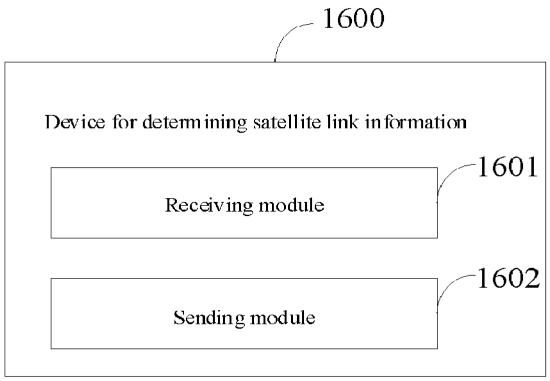
FIG. 19 is a schematic diagram of a structure of another device for determining satellite link information according to an embodiment of the present disclosure.

In some embodiments, as shown in FIG. 19, the device 1600 for determining satellite link information further includes:

a sending module 1602, configured to send the satellite link information corresponding to the terminal to a policy control function (PCF) network element.

In some embodiments, the receiving module 1601 may also be configured to receive a satellite link information subscription request from the PCF network element, the satellite link information subscription request instructing the SMF network element to send, in response to receiving the satellite link information, the satellite link information to the PCF network element.

In some embodiments, the sending module 1602 may also be configured to obtain the satellite link information from the UPF network element by sending a packet data unit session establishment request or a packet data unit session modification request to the UPF network element.

Figure 20:
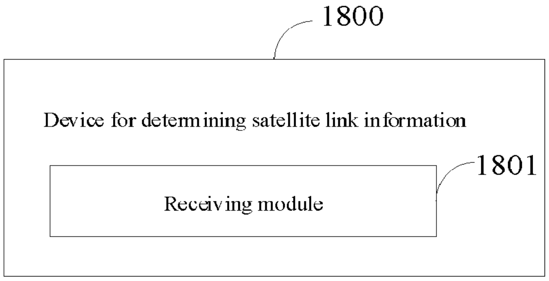
FIG. 20 is a schematic diagram of a structure of yet another device for determining satellite link information according to an embodiment of the present disclosure.

FIG. 20 is a schematic diagram of a structure of a device for determining satellite link information in an embodiment of the present disclosure. The device is applied to a policy control function (PCF) network element.

As shown in FIG. 20, the device 1800 for determining satellite link information includes a receiving module 1801, configured to obtain the satellite link information corresponding to a terminal from a session management function (SMF) network element.

The satellite link information includes at least one of satellite access information related to connection of the terminal with an access network node or satellite backhaul information related to connection of the access network node with a corresponding UPF network element.

In an embodiment of the present disclosure, the PCF network element may obtain the satellite link information currently corresponding to the terminal from the SMF network element, so that it can configure a corresponding quality of service identity for the terminal based on the satellite link information currently corresponding to the terminal, thereby meeting the service requirements of the terminal.

In some embodiments, the satellite backhaul information includes any one or more of that whether the terminal is currently using satellite backhaul or not, that whether the satellite backhaul currently used by the terminal is changed or not, or that whether the terminal is currently within an area of interest or not; and the satellite access information includes any one or more of that whether the terminal is currently using satellite access or not, that whether the satellite access currently used by the terminal is changed, or that whether the terminal is currently within the area of interest.

Figure 21:
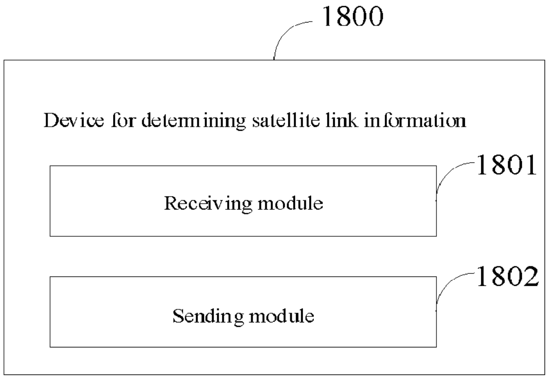
FIG. 21 is a schematic diagram of a structure of yet another device for determining satellite link information according to an embodiment of the present disclosure.

In some embodiments, the device 1800 for determining satellite link information further includes, as shown in FIG. 21 a sending module 1802, configured to send a satellite link information subscription request to the SMF network element, the satellite link information subscription request instructing the SMF network element to send, in response to receiving the satellite link information, the satellite link information to the PCF network element.

In some embodiments, the sending module 1802 may also be configured to send the satellite link information corresponding to the terminal to an application function (AF) network element.

Figure 22:
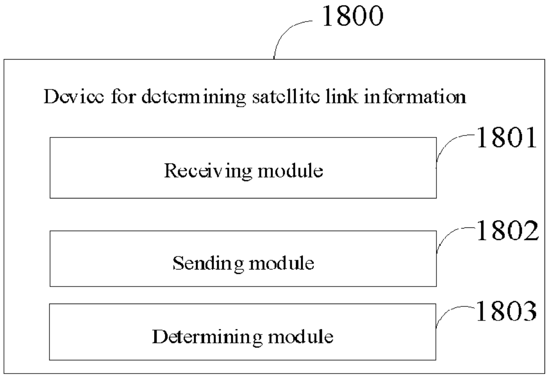
FIG. 22 is a schematic diagram of a structure of yet another device for determining satellite link information according to an embodiment of the present disclosure.

In some embodiments, the device 1800 for determining satellite link information further includes, as shown in FIG. 22 a determining module 1803, configured to determine a quality of service of an application function (AF) session corresponding to the terminal based on the satellite link information corresponding to the terminal.

Figure 23:
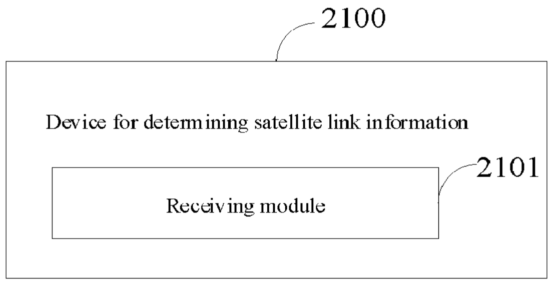
FIG. 23 is a schematic diagram of a structure of further another device for determining satellite link information according to an embodiment of the present disclosure.

FIG. 23 is a schematic diagram of a structure of a device for determining satellite link information in an embodiment of the present disclosure. The device is applied to an application function (AF) network element.

As shown in FIG. 23, the device 2100 for determining satellite link information includes a receiving module 2101, configured to obtain satellite link information corresponding to a terminal from a policy control function (PCF) network element.

The satellite link information comprises at least one of satellite access information related to connection of the terminal with an access network node or satellite backhaul information related to connection of the access network node with a corresponding UPF network element.

In an embodiment of the present disclosure, the AF network element may obtain the satellite link information currently corresponding to the terminal from the PCF network element.

In some embodiments, the satellite backhaul information includes any one or more of that whether the terminal is currently using satellite backhaul or not, that whether the satellite backhaul currently used by the terminal is changed or not, or that whether the terminal is currently within an area of interest or not, and the satellite access information includes any one or more of that whether the terminal is currently using satellite access or not, that whether the satellite access currently used by the terminal is changed, or that whether the terminal is currently within the area of interest.

According to an embodiment of the present disclosure, the present disclosure also provides a communication device and a computer readable storage medium.

Figure 24:
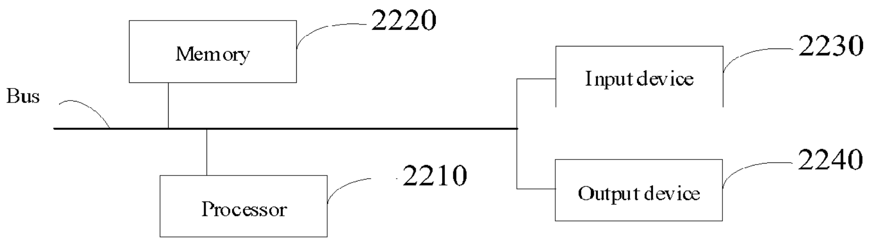
FIG. 24 is a schematic diagram of a structure of a communication device according to an embodiment of the present disclosure.

FIG. 24 is a block diagram of a communication device according to an embodiment of the present disclosure. The communication device is intended to represent various forms of digital computers such as laptop, desktop computer, workstation, personal digital assistant, servers, blade server, mainframe computer, and other suitable computers. The communication device may also represent various forms of mobile devices such as personal digital processing, cellular phone, smart phone, wearable device, and other similar computing device. The components shown herein, their connections and relationships, and their functions are shown as examples only and are not intended to limit the implementations of the present disclosure described and/or claimed herein.

As shown in FIG. 24, the communication device includes: one or more processors 2210, a memory 2220, and an interface for connecting various components including a high speed interface and a low speed interface. The components are interconnected using different buses and may be mounted on a common motherboard or otherwise as desired. The processor may process instructions executed within the communication device, including instructions stored in or on the memory to display graphical information of GUI on an external input/output device (e.g., a display device coupled to the interface). In other implementations, a plurality of processors and/or a plurality of buses may be used with a plurality of memories, if desired. Similarly, a plurality of communication devices may be connected, with individual devices providing some of necessary operations (e.g., as a server array, a group of blade servers, or a multiprocessor system). One processor 2210 is illustrated as an example in FIG. 24.

The memory 2220 is a non-volatile computer-readable storage medium provided by the present disclosure. The memory stores instructions executable by at least one processor to cause the at least one processor to perform a method provided by the present disclosure. The non-volatile computer-readable storage medium of the present disclosure stores computer instructions that are used to cause a computer to perform the method provided in the present disclosure.

The memory 2220, serving as a non-volatile computer-readable storage medium, can be used to store non-volatile software programs, non-volatile computer-executable programs, and modules such as program instructions/modules corresponding to the method in the embodiment of the present disclosure. The processor 2210 executes various functional applications of the server as well as data processing by running the non-volatile software programs, instructions, and modules stored in the memory 2220, i.e., implementing the method in the above method embodiment.

The memory 2220 may include a program storage area and a data storage area. The program storage area may store an operating system and an application program for at least one function, and the data storage area may store data created based on the use of the communication device, and the like. Additionally, the memory 2220 may include a high-speed random access memory, and may also include a non-volatile memory such as at least one disk memory device, a flash memory device, or other non-volatile solid state memory devices. In some embodiments, the memory 2220 may include memories remotely located relative to the processor 2210, and these remote memories may be connected to the communication device via a network. Examples of the above network include, but are not limited to, Internet, enterprise intranet, local area network, mobile communication network, and combinations thereof.

The communication device may also include an input device 2230 and an output device 2240. The processor 2210, the memory 2220, the input device 2230, and the output device 2240 may be connected via a bus or otherwise, and FIG. 24 illustrates as an example that they are connected via a bus.

The input device 2230 may receive inputting numeric or character information, and generate inputs of key signals related to user settings and function control of the communication device, and may be, for example, touch screen, keypad, mouse, trackpad, touchpad, indicator lever, one or more mouse buttons, trackball, joystick, and other input devices. The output device 2240 may include a display device, an auxiliary lighting device (e.g., an LED), a haptic feedback device (e.g., a vibration motor), and the like. The display device may include, but is not limited to, a liquid crystal display (LCD), a light emitting diode (LED) display, and a plasma display. In some implementations, the display device may be a touch screen.

Various implementations of the systems and techniques described herein may be implemented in digital electronic circuit system, integrated circuit system, dedicated ASIC (Application Specific Integrated Circuit), computer hardware, firmware, software, and/or combination thereof. These various implementations may include implementation in one or more computer programs that may be executed and/or interpreted on a programmable system including at least one programmable processor, which may be a special-purpose or general-purpose programmable processor, that receives data and instructions from a storage system, at least one input device, and at least one output device, and that transmits data and instructions to that storage system, at least one input device, and at least one output device.

These computer programs (also referred to as program, software, software application, or code) include machine instructions for programmable processor and may be implemented using high-level procedural and/or object-oriented programming languages, and/or assembly/machine languages. As used herein, the terms "machine-readable medium" and "computer-readable medium" refer to any computer program product, device, and/or apparatus (e.g., disc, optical disc, memory, programmable logic device (PLD)) used to provide machine instructions and/or data to a programmable processor, including a machine-readable medium that receives machine instructions as machine-readable signals. The term "machine-readable signal" refers to any signal used to provide machine instructions and/or data to a programmable processor.

In order to provide interaction with a user, the system and technique described herein may be implemented on a computer having: a display device (e.g., a CRT (cathode ray tube) or LCD (liquid crystal display) monitor) for displaying information to the user; and a keyboard and pointing device (e.g., a mouse or trackball) by which the user can provide input to the computer. Other types of devices may also be used to provide input to the computer. Other types of devices may also be used to provide interaction with the user. For example, the feedback provided to the user may be any form of sensory feedback (e.g., visual feedback, auditory feedback, or haptic feedback); and the input from the user may be received in any form, including acoustic input, voice input, or haptic input.

The system and technique described herein may be implemented in a computing system that includes a background component (e.g., as a data server), or a computing system that includes a middleware component (e.g., an application server), or a computing system that includes a front-end component (e.g., a user computer with a graphical user interface or a web browser by which a user can communicate with the system and technique described herein), or in a computing system that includes any combination of such background component, middleware component, or front-end component. The components of the system may be interconnected by digital data communications (e.g., a communication network) in any form or medium. Examples of communication network include local area network (LAN), wide area networks (WAN), and the Internet.

A computer system may include a client and a server. The client and server are generally remote from each other and typically interact over a communications network. A client-server relationship is created by computer programs that run on corresponding computers and have the client-server relationship with each other.

It should be understood that steps may be reordered, added, or deleted using various forms of processes shown above. For example, the steps recited in the present disclosure may be performed in parallel or sequentially or in a different order, as long as they achieve the desired result of the technical solution disclosed in the present disclosure, which is not limited in the present disclosure.

The above specific embodiments do not constitute a limitation on the protection scope of the present disclosure. It should be appreciated by those skilled in the art that various modifications, combinations, sub-combinations, and substitutions may be made based on design requirements and other factors. Any modifications, equivalent substitutions, improvements, etc. made within the spirit and principle of the present disclosure shall be included within the protection scope of the present disclosure.

What is claimed is:

1. A method for determining satellite link information, which is applied to a user plane function (UPF) network element, comprising:

determining the satellite link information corresponding to a terminal based on information of a cell in which the terminal is located and network deployment information corresponding to the UPF network element, wherein the information of the cell comprises at least one of an identity of the cell or an identity of an access network node to which the cell belongs, the network deployment information comprises first deployment information indicating whether a satellite link is available for connection of the UPF network element with the access network node and second deployment information indicating whether the satellite link is available for connection of the access network node with the terminal, and the satellite link information comprises at least one of satellite backhaul information related to the connection of the UPF network element with the access network node or satellite access information related to the connection of the access network node with the terminal.

2. The method according to claim 1, wherein determining the satellite link information corresponding to the terminal based on the information of the cell in which the terminal is located and the network deployment information corresponding to the UPF network element comprises:

when the first deployment information indicates that the satellite link is available for the connection of the UPF network element with the access network node, determining the satellite backhaul information corresponding to the terminal based on the information of the cell in which the terminal is located, the satellite backhaul information comprising any one or more of that whether the terminal is currently using satellite backhaul or not, that whether the satellite backhaul currently used by the terminal is changed or not, or that whether the terminal is currently within an area of interest or not; and/or when the second deployment information indicates that the satellite link is available for the connection of the access network node with the terminal, determining the satellite access information corresponding to the terminal based on the information of the cell in which the terminal is located, the satellite access information comprising any one or more of that whether the terminal is currently using satellite access or not, that whether the satellite access currently used by the terminal is changed, or that whether the terminal is currently within the area of interest.

3. The method according to claim 1, further comprising: sending the satellite link information corresponding to the terminal to a session management function (SMF) network element.

4. The method according to claim 3, wherein sending the satellite link information corresponding to the terminal to the session management function (SMF) network element comprises:

sending, in response to a packet data unit session establishment request or a packet data unit session modification request from the SMF network element, the satellite link information corresponding to the terminal to the SMF network element.

5. The method according to claim 1, further comprising: sending a terminal information subscription request to the access network node corresponding to the UPF network element, the terminal information subscription request instructing the access network node to send, to the UPF network element, the information of the cell in which the terminal establishing the connection with the access network node is located; and/or receiving, from the access network node corresponding to the UPF network element, the information of the cell in which the terminal establishing the connection with the access network node is located.

6. A device for determining satellite link information, which is applied to a user plane function (UPF) network element, comprising:

a processor; and a memory, having a computer program stored thereon that, when being executed by the processor, causes the processor to implement the method according to claim 1.

7. A non-transitory computer readable storage medium having a computer program stored thereon that, when being executed by a processor, causes the processor to implement the method according to claim 1.

* * * * *